(12) United States Patent
Li

(10) Patent No.: US 8,004,806 B2
(45) Date of Patent: Aug. 23, 2011

(54) SOLID-STATE DISCONNECT DEVICE

(75) Inventor: Xueqing Li, Highlad Park, NJ (US)

(73) Assignee: United Silicon Carbide, Inc., Monmouth Junction, NJ (US)

( * ) Notice: Subject to any disclaimer, the term of this patent is extended or adjusted under 35 U.S.C. 154(b) by 358 days.

(21) Appl. No.: 12/434,880

(22) Filed: May 4, 2009

(65) Prior Publication Data

US 2010/0277847 A1    Nov. 4, 2010

(51) Int. Cl.
*H02H 9/00* (2006.01)
*H02H 3/08* (2006.01)
*H02H 9/02* (2006.01)
*H02H 9/08* (2006.01)

(52) U.S. Cl. .................... 361/58; 361/93.1; 361/93.9

(58) Field of Classification Search .............. 361/58
See application file for complete search history.

(56) References Cited

U.S. PATENT DOCUMENTS

| | | | |
|---|---|---|---|
| 4,245,184 A | 1/1981 | Billings et al. | |
| 5,606,482 A | 2/1997 | Witmer | |
| 5,742,463 A | 4/1998 | Harris | |
| 6,104,106 A | 8/2000 | Partridge | |
| 6,515,840 B2 | 2/2003 | Covi et al. | |
| 6,954,347 B1 | 10/2005 | Chaudhry | |
| 6,970,337 B2 | 11/2005 | Strahm | |
| 7,139,157 B2 | 11/2006 | Taylor | |
| 7,262,946 B2 | 8/2007 | Harris et al. | |
| 7,324,315 B2 * | 1/2008 | Harris | 361/58 |
| 7,342,433 B2 | 3/2008 | Harris et al. | |
| 7,369,387 B2 | 5/2008 | Harris et al. | |

FOREIGN PATENT DOCUMENTS

WO    WO2006/053238 A2    5/2006

OTHER PUBLICATIONS

S. H. Ryu, S. Krishnaswami, B. Hull, J. Richmond, A. Agarwal, and A. Hefner, "10kV, 5A 4H-SiC Power DMOSFET," in Proc. ISPSD, Jun. 2006, pp. 1-4.
Yuzhu Li, Petre Alexandrov, Jianhui Zhang, Larry X. Li, and Jian H. Zhao, "10kV, 87mOHMS-cm2 Normally-off 4H-SiC Vertical Junction Field-Effect Transistors," Materials Science Forum vols. 527-529, 2006, pp. 1187-1190.

* cited by examiner

*Primary Examiner* — Dharti Patel
(74) *Attorney, Agent, or Firm* — Michael Crilly, Esq.

(57) ABSTRACT

A solid-state disconnect device capable of isolating and protecting circuits and equipment from overloads and undesired transients is presented. The protection device includes at least one depletion mode circuit block having three terminals (drain, gate, and source), which in its simplest form is implemented by a single n-channel depletion mode field-effect transistor, and two enhancement mode circuit blocks each having three terminals (drain, gate and source), each implemented in simplest form by a single n-channel enhancement mode field-effect transistor. The current conducting path of the first enhancement mode circuit block is connected in series with the current conducting path of the depletion mode circuit block. The drain terminal of the second enhancement mode circuit block is connected through a current limiting load to both the gate terminal of the second enhancement mode circuit block and the drain terminal of the first enhancement mode circuit block. The gate terminal of the first enhancement mode circuit block is connected to the drain terminal of the second enhancement mode circuit block. The source terminals of the two enhancement circuit blocks are both connected to the gate terminal of the depletion mode circuit block. Unidirectional and bidirectional embodiments are disclosed.

26 Claims, 19 Drawing Sheets

SOLID-STATE DISCONNECT DEVICE

CROSS REFERENCE TO RELATED APPLICATIONS

None.

FEDERALLY SPONSORED RESEARCH AND DEVELOPMENT

None.

BACKGROUND OF THE INVENTION

1. Field of the Invention

The invention generally relates to the field of protection devices. In particular, the invention is a solid-state disconnect device capable of preventing the flow of undesirable voltage or current transients and/or isolating equipment from undesirably high voltages or currents.

2. Background

Traditional protection devices which function as circuit disconnects, examples including fuses and electromechanical circuit breakers, are inherently problematic. For example, such devices have low-switching speeds, require replacement after each trip event, are prone to arcing and switching bounce with associated noise and wear problems, and/or are often large on a volume basis resulting in an unwieldy package.

Solid-state technology applied to such protection devices avoids these disadvantages while offering higher reliability and longer lifetime. Accordingly, solid-state circuit disconnects have become desirable alternatives to traditional protection devices.

Various solid-state disconnect devices have been devised utilizing complex circuitry with an additional power source, examples including devices by Billings et al. in U.S. Pat. No. 4,245,184 entitled AC Solid-State Circuit Breaker, Witmer in U.S. Pat. No. 5,606,482 entitled Solid State Circuit Breaker, Partridge in U.S. Pat. No. 6,104,106 entitled Solid State Circuit Breaker, and Covi et al. in U.S. Pat. No. 6,515,840 entitled Solid State Circuit Breaker with Current Overshoot Protection. However, it is more desirable that a circuit protection device includes two terminals and no additional power source, much like a fuse.

Harris, in U.S. Pat. No. 5,742,463 entitled Protection Device using Field Effect Transistors, describes a two-terminal, solid-state protection device without an additional power supply. Several disadvantages are noteworthy. First, the protection device requires p-channel, high-voltage field-effect-transistors (FETs) which generally have a high conduction resistance because of low hole mobility. Second, the protection device requires both gate-to-source terminals and gate-to-drain terminals of the FETs to have the same high-voltage blocking capability which is difficult to achieve because MOSFETs block the voltage between the drain-to-source and drain-to-gate terminals, and the gate-to-source terminal generally does not have such blocking capability. For example, the gate and source terminals of all known FETs typically block a few volts to a few tens of volts because of a low-voltage Schottky barrier diode in MESFETs, a low-voltage PN diode in JFETs, and a low-voltage MOS capacitor in MOSFETs. Third, the protection device requires a large number of FETs connected in series to increase the voltage blocking capability of the device, inevitably resulting in a higher conduction loss. Fourth, the tripping current is difficult to control with the protection device.

Therefore, what is required is a solid-state disconnect device having two terminals and no additional power supply that avoids the disadvantages of the related arts.

SUMMARY OF THE INVENTION

An object of the present invention is to provide a solid-state disconnect device having two terminals and no additional power supply that avoids the disadvantages of the related arts.

For high-voltage and high-current protection, silicon (Si) power devices are generally connected in parallel with the system to be protected because such devices have a high insertion loss and a large capacitance which dissipate too much power in a power system or reduce the communication bandwidth in a communication system when connected directly in series. With the introduction of wide bandgap semiconductor power devices, such as those based on silicon carbide (SiC), gallium nitride (GaN), and diamond, direct serial connectivity of protection devices in the circuit or system to be protected is more feasible at voltages over 10,000 volts, because these wide bandgap switches have a specific ON-state resistance nearly a thousand times lower than silicon components. The benefits include improved insertion loss, speed, and bandwidth and lower costs.

The solid-state disconnect device described herein is a two-terminal protection device connectable in series between a power supply and a load while avoiding an additional power source. The disconnect device further includes a depletion mode circuit block (DCB), an enhancement mode circuit block (ECB), an enhancement mode circuit block (ECB) with a positive threshold voltage, and a current limiting load (CLL). The CLL could be a simple resistor or a dynamic load formed by a circuit having a resistance that increases with terminal voltage.

The DCB is broadly defined as a circuit block having three terminals, namely a drain, source, and gate, and a negative threshold voltage that controls the current conduction between the drain and source terminals. When the voltage across the gate and source terminals is larger than the negative threshold voltage, the circuit block is turned ON and current conduction between the drain and source terminals increases with an increase in voltage across the gate and source terminals. When the voltage across the gate and source terminals is below the negative threshold voltage, the circuit block is OFF and negligible current flows through the circuit block.

The DCB could include a variety of designs composed of single and multiple components. In its simplest form, the DCB could be a single depletion mode n-channel transistor. In other embodiments, the DCB could be composed of any number of depletion mode n-channel transistors connected in a serial and/or a parallel arrangement. The depletion mode n-channel transistors should withstand the surge voltage and surge current of the application. Exemplary depletion mode components include junction field effect transistors (JFETs), metal oxide semiconductor field effect transistors (MOSFETs), static induction transistors, and insulated-gate bipolar transistors (IGBTs); however, depletion mode JFETs are generally preferred. The desired features of the depletion mode transistors include a low insertion loss, a low capacitance, and ability to withstand a surge current and voltage without breakdown. Depending on the specific application, the voltage blocking capability could be up to a few tens of thousands of volts while the current capability could be up to a few thousands of amperes.

The ECB is broadly defined herein as a circuit block having three terminals, namely a drain, source, and gate, and a positive threshold voltage. When the voltage across the gate and source terminals is larger than the positive threshold voltage, the circuit block is turned ON and current can flow between the drain and source terminals. When the voltage across the gate and source terminals is less than the positive threshold voltage, the circuit block is OFF.

The ECB could include a variety of designs composed of single and multiple components. In its simplest form, the ECB could be a single enhancement mode n-channel transistor. In other embodiments, any number of enhancement mode n-channel transistors could be connected in a serial and/or parallel arrangement. Exemplary enhanced mode components include junction field effect transistors (JFETs), metal oxide semiconductor field effect transistors (MOSFETs), static induction transistors, and insulated-gate bipolar transistors (IGBTs); however, enhancement mode n-channel MOSFETs are generally preferred.

In its simplest form, the solid-state disconnect or protection device could include a DCB, a first ECB, a second ECB, and a CLL. The DCB and first ECB are connected in a serial arrangement so as to form the current path of the two-terminal protection device. The source terminal of the DCB is connected to the drain terminal of the first ECB. The drain terminal of the second ECB is connected to the gate terminal of the first ECB and further connected through the CCL to the drain terminal of the first ECB. The gate terminal of the DCB and the source terminal of the second ECB are connected and further connected to the source terminal of the first ECB. The gate terminal of the second ECB is connected to the drain terminal of the first ECB. The voltage drop across the protection device, which increases as surge current increases, is used to control the OFF and ON status of the second ECB. The OFF and ON status of the second ECB in turn controls the OFF and ON status of the first ECB which in turn further controls the OFF and ON status of the DCB. The described circuit architecture provides protection functionality to a disconnect system or equipment protected from a high-voltage spike, and undesirable surge current flowing from the drain-to-source of the DCB and further through the drain-to-source of the first ECB.

The protection device described herein could include optional components to further improve the performance of the disconnect system. For example, in applications requiring current to flow in both directions, a current bypass component, which conducts current in one direction and blocks current in the other direction, one non-limiting example being a Schottky diode, could be connected to the source and drain terminals of the DCB or the first ECB to allow current to flow from source to drain terminals, when the DCB or the first ECB has poor or no current conduction capability from the source-to-drain terminals. In another example, a low-pass RC network could be connected between the drain terminal of the DCB and the source terminal of the first ECB to filter out high-frequency voltage spikes generated during transient and tripping events. In yet another example, a voltage-limiting component, examples including but not limited to a reverse selenium rectifier, a varistor, a simple resistor, a circuit block, or preferably a voltage-clamping Zener diode, could be connected to the source and gate terminals of each of the ECBs to prevent the gate from electric breakdown because of a high voltage. In still another example, a temperature compensation component, one non-limiting example being a thermistor with a negative temperature coefficient in resistance, could be connected between the gate and source terminals of the second ECB to make the tripping current insensitive to temperature change. In still yet another example, a variable resistor could be connected between the gate and source terminals of the second ECB to adjust the tripping current. In yet still another example, a capacitor can be connected between the gate and source terminals of the second ECB to suppress voltage spikes across the gate and source terminals of the second ECB so as to prevent premature trigger of the device. The gate terminal of the second ECB should be connected through a current limiting load instead of connected directly to the drain terminal of the first ECB, when at least one of the aforementioned optional components is connected between the gate and source terminals of the second ECB in order to ensure that a large enough voltage is established across the first ECB when the first ECB is turned OFF so as to enable the turn OFF of the DCB.

For higher current protection, it is preferable that the drain terminal of the second ECB be connected through a CLL to the drain of the DCB, rather than to the drain of the first ECB, and the gate of the second ECB be connected through another CLL to the drain of the DCB, rather than directly to the drain of the first ECB.

The protection device described herein could be arranged in either a unidirectional or a bidirectional circuit. For unidirectional protection, the device could include one form of the circuit described above. For bidirectional protection, two such circuits could be connected in mirror symmetry in a serial arrangement with a load. In the latter, it is preferred for the drain terminals of the DCBs of the two circuits to be connected, although the two source terminals of the DCBs could also be connected in mirror symmetry. For bidirectional protection, it is further preferred that both gates of the ECBs in one circuit be connected through their respective CLLs to the source terminal of the first ECB in the other circuit instead of to the drain of the DCB in the same circuit, although connecting only one of the two gates of the ECBs in one circuit to the source of the first ECB in the other circuit is also possible. Optional components described herein could be added to bidirectional embodiments of the invention as required.

Several advantages are offered by the invention. The disconnect device provides unidirectional and bidirectional protection against surge current and voltage, resets automatically, has a very-high tripping speed on the order of microseconds to sub-microseconds, is capable of protecting both DC and AC power systems, facilitates adjustments to and control of tripping current, and is insensitive to temperature variations.

REFERENCE NUMERALS

1 Terminal
2 Terminal
3 Terminal
4 Terminal
5, 5a, 5b DCB
6, 6a, 6b First ECB
7, 7a, 7b Second ECB
8, 8a, 8b CLL
9, 9a, 9b Second CLL
10, 10a, 10b Voltage limiting component
11, 11a, 11b Voltage limiting component
12, 12a, 12b Temperature compensation component
13, 13a, 13b Variable resistor
14, 14a, 14b Capacitor
15, 15a, 15b Resistor
16, 16a, 16b Capacitor
17, 17a, 17b Current bypass component
18, 18a, 18b Current bypass component
19 Capacitor
20 Resistor 30, 30a, 30b First node
31, 31a, 31b Second node
32, 32a, 32b Third node
33, 33a, 33b Fourth node
34, 34a, 34b Fifth node
35, 35a, 35b Sixth node
36, 36a, 36b Seventh node
40 Depletion mode FET
41 Feedback resistor
42 Depletion mode FET
43 Resistor
44 Depletion mode FET
50 Protection device
52 Protection device
54 Protection device
56, 56a, 56b Protection device
58 Protection device
60 Protection device
61 Protection device
62 Bidirectional protection device
63 Bidirectional protection device
64 Bidirectional protection device
65 Bidirectional protection device
81 Terminal
82 Terminal
83 Terminal
84 Terminal

BRIEF DESCRIPTION OF THE INVENTION

Additional aspects, features, and advantages of the invention will be understood and will become more readily apparent when the invention is considered in the light of the following description made in conjunction with the accompanying drawings.

DETAILED DESCRIPTION

Figure 1A:
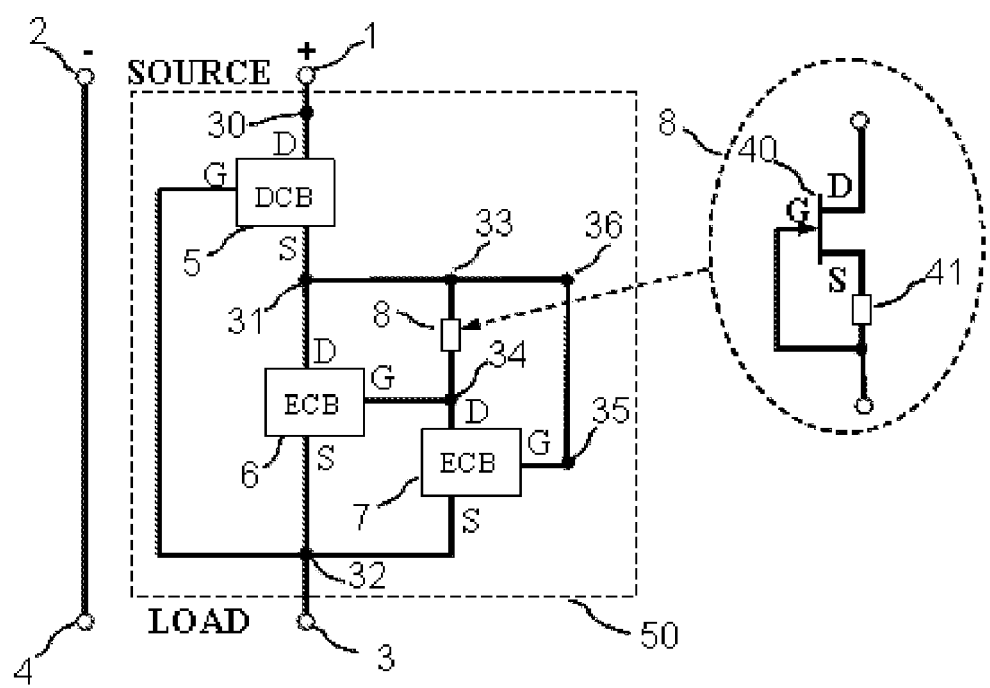
FIG. 1a is a circuit diagram illustrating a solid-state protection device in accordance with an embodiment of the invention.

Reference will now be made in detail to several preferred embodiments of the invention that are illustrated in the accompanying drawings. Wherever possible, same or similar reference numerals are used in the drawings and the description to refer to the same or like parts. Nodes are referenced for descriptive purposes only and do not necessarily represent a structure or element of the invention. The drain, gate, and source terminals of components are identified by the letters D, S, and G, respectively, in FIGS. 1a-1c, 2a-2d, 3a, 3b, 4a, and 4b.

Referring now to FIG. 1a, an embodiment of the protection device 50 is shown for a unidirectional device capable of preventing a surge current that exceeds a preset trip value between terminals 1 and 3, by disconnecting a load at terminals 3 and 4 in response to a voltage surge. The protection device 50 is connected in series between a source or voltage supply across terminals 1 and 2 with the polarity shown and the load across terminals 3 and 4. The protection device 50 includes a DCB 5, a first ECB 6, a second ECB 7, and a CLL 8 connected as shown via nodes 30-36. The DCB 5 is a depletion mode circuit block with a negative threshold voltage. The first ECB 6 and second ECB 7 are enhancement mode circuit blocks with a positive threshold voltage. The drain terminal of the DCB 5 is connected to the first node 30. The gate terminal of the DCB 5 and the source terminals of the first ECB 6 and the second ECB 7 are connected to the third node 32. The source terminal of the DCB 5 and the drain terminal of the first ECB 6 are connected to the second node 31. The gate terminal of the first ECB 6 and the drain terminal of the second ECB 7 are connected to the fifth node 34. The gate terminal of the second ECB 7 is connected to the sixth node 35. The CLL 8 is connected between the fourth node 33 and fifth node 34. Thereafter, the second node 31, fourth node 33, sixth node 35, and seventh node 36 are arranged and connected as shown.

The functionality of the protection circuit 50 is described with further reference to FIG. 1a. In normal operation, a positive current flows from terminal 1 to terminal 3. The voltage drop across the second node 31 and the third node 32 is larger than the threshold voltage of the first ECB 6 but smaller than the threshold voltage of the second ECB 7. As such, the first ECB 6 is maintained in the ON-state while the second ECB 7 is in the OFF-state during normal operating conditions. The DCB 5 is in the ON-state as a normally ON device and the magnitude of its gate-to-source voltage, approximately equal to the magnitude of the voltage drop across the third node 32 and second node 31, is smaller than the magnitude of its negative threshold voltage.

When a surge current or sudden voltage increase at terminal 1 attempts to cross to terminal 3, the voltage drop between the second node 31 and third node 32 momentarily increases, resulting in a momentary increase in the gate voltage of the second ECB 7. The second ECB 7 remains in the OFF-state until the voltage drop between the second node 31 and third node 32 reaches the threshold voltage of the second ECB 7 placing the second ECB 7 in the ON-state at a predetermined surge current. The peak surge current at which the disconnect trips is therefore controlled by the magnitude of the threshold voltage of the second ECB 7 and the forward characteristics of the first ECB 6. After the second ECB 7 is turned ON, the voltage drop across the drain terminal, at the fifth node 34, and the source terminal, at the third node 32, of the second ECB 7 is decreased to a value less than the threshold voltage of the first ECB 6 so as to turn OFF the first ECB 6. Once the first ECB 6 is OFF, current is forced to pass through the CLL 8 and the second ECB 7. The CLL 8 produces a voltage drop across the second node 31 and third node 32 coupled to the source and gate terminals of the DCB 5, respectively. The first ECB 6 should be sufficiently capable of handling a drain-to-source voltage larger than the numerical value of the negative threshold voltage of the DCB 5. A typical threshold voltage for the DCB 5 could be in the range of −1 volts to −50 volts, although other values are possible. When the drain-to-source voltage of the first ECB 6 increases to a value greater than the numerical value of the threshold voltage of the DCB 5, the DCB 5 is turned OFF. Thereafter, the protection circuit 50 enters the OFF-state so as to prevent the surge current from reaching and damaging the load and to disconnect the load from the high-voltage spike. The protection device 50 resumes normal operation automatically once the voltage drop across the device from terminals 1 to 3 decreases to a value causing the second ECB 7 to turn OFF after the fault causing the current surge is cleared.

A single DCB 5 comprising a high-voltage depletion mode n-channel transistor could be employed to disconnect the surge voltage because the voltage blocked by the DCB 5 is across the drain and source rather than across the gate and source as provided in U.S. Pat. No. 5,742,463. For example, a single silicon carbide FET could be used to block a voltage surge over 10,000 volts, non-limiting examples being a 10 kV, 5 A 4H—SiC Power DMOSFET and a 10 kV, 87 mΩ-cm$^2$ normally-OFF 4H—SiC Vertical Junction Field-Effect Transistor. The corresponding DCB 5 and first ECB 6 should have similar current handling capability dependent on the specific application, which could range from a few milli-amperes to a few tens of thousands of amperes. The second ECB 7 would not necessarily require a high current capability because it is limited by the CLL 8.

Figure 1B:
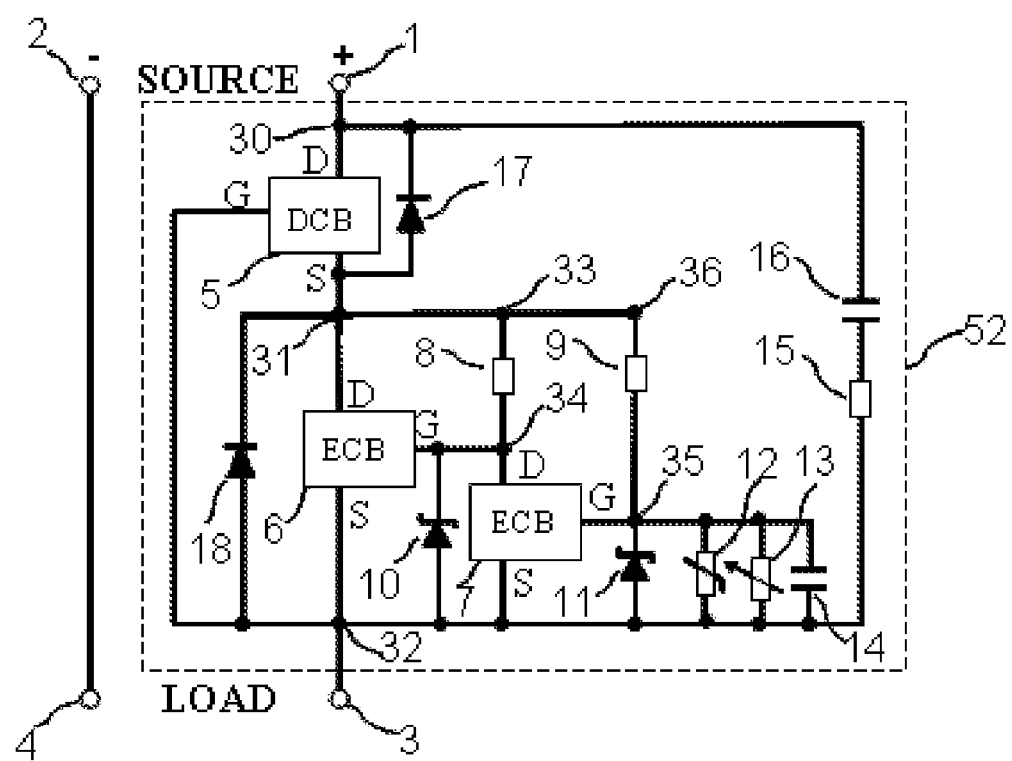
FIG. 1b is a circuit diagram illustrating the solid-state protection device from FIG. 1a with optional components in accordance with an embodiment of the invention.

Referring now to FIG. 1b, the protection device 50 from FIG. 1a is shown with a variety of optional components to form various alternate protection devices 52. The architecture of the protection device 52 is identical to that in FIG. 1a, except where otherwise indicated. For example, a second CLL 9 could be provided between the sixth node 35 and seventh node 36. A voltage limiting component 10 could be connected as needed between the gate and source terminals of the first ECB 6 to prevent electric breakdown of the gate due to a high voltage event. Another voltage limiting component 11 could be connected as needed between the gate and source terminals of the second ECB 7, so as to prevent electric breakdown of the gate due to a high voltage event. Although Zener diodes are represented in FIG. 1b, any voltage-limiting components, non-limiting examples including reverse selenium rectifiers, varistors made from various materials, a simple resistor, or a circuit block, but preferably a voltage-clamping Zener diode, could be employed as one or both voltage limiting components 10, 11.

Referring again to FIG. 1a, the ON-state resistances of the DCB 5 and first ECB 6 increase and the threshold voltage of the second ECB 7 decreases as the temperature of the protection device 50 increases. As a consequence, the trip current of protection device 50 will decrease.

Referring again to FIG. 1b, the protection device 52 could include a temperature compensation component 12 with a negative temperature coefficient (NTC) in resistance, a non-limiting example being an NTC thermistor, in order to maintain a relatively constant trip current. The temperature compensation component 12 could be connected between the gate and source terminals of the second ECB 7. The temperature compensation component 12 and second CLL 9 form a voltage divider. A decrease in the resistance of the temperature compensation component 12 with an increase in temperature tends to reduce the voltage drop across the gate and source terminals of the second ECB 7. As a result, an increase in the ON-resistance of the DCB 5 and the first ECB 6 and a decrease in the threshold voltage of the second ECB 7 due to a temperature increase are compensated by the decrease in the bias voltage across the gate-to-source terminals of the second ECB 7. Hence, the trip current of the protection device 52 could be nearly temperature independent over a specified range of temperatures.

Referring again to FIG. 1b, an optional variable resistor 13 could also be connected between the gate and source terminals of second ECB 7 to adjust the voltage drop across the gate and source terminals so as to adjust the trip current. An optional capacitor 14 could be further connected between the gate and source terminals of the second ECB 7 to suppress potential voltage spikes across the gate and source terminals to prevent a premature trigger of the second ECB 7. An optional RC network could be further connected between the first node 30 and the third node 32, preferably after the capacitor 14, to filter out high-frequency voltage spikes generated during transient and trip conditions. One non-limiting exemplary embodiment of the RC network is a resistor 15 and capacitor 16, as represented in FIG. 1b.

Referring again to FIG. 1b, the protection device 52 could further include current bypass components 17, 18 as required, which conduct current in one direction and block current in the other direction. The simplest form of a current bypass component is a Schottky diode, although other components are possible. The current bypass components 17, 18 could be connected in parallel to the current conducting channel between the source and drain terminals of the DCB 5 and first ECB 6, respectively, when an application requires current to flow from terminal 3 to terminal 1, and when the DCB 5 or first ECB 6 has poor or no current conducting capability from source-to-drain terminals. For example, MOSFETs contain a built-in body diode between its source and drain terminals which allows current conduction from source-to-drain but with a relatively large voltage drop. As such, it is preferred that a low-voltage-drop current bypass diode be connected between the source and drain terminals of each MOSFET. In another example, IGBTs do not include a body diode so a low-voltage-drop current bypass diode could be included to provide reverse current conduction when a specific application requires current to flow from terminal 3 to terminal 1.

The functionality of the protection device 52 of FIG. 1b is similar to the protection device 50 of FIG. 1a. The protection device 52 is a unidirectional protection device capable of preventing a surge current that exceeds a preset trip current to conduct from terminal 1 to terminal 3 and disconnecting the load from a voltage surge. However, current conduction in the protection device 52 is bidirectional.

The CLLs 8, 9 in FIGS. 1a and 1b could include a variety of devices. Each CLL 8, 9 could be a resistor with a predetermined value of resistance. Preferably, each CLL 8, 9 could be a dynamic load formed by a circuit block having increased resistance with increased terminal voltage in order to reduce power dissipation. For example, the CLL 8 in FIG. 1a is shown including a depletion mode FET 40 and a feedback resistor 41 capable of providing a small load resistance for a short RC charge time for the first ECB 6 at low voltage and a very large load resistance to limit the leakage current in a high-voltage blocking mode.

The DCBs 5, 5a, 5b described herein could include a variety of single and multi-element devices. In one example, the DCBs 5, 5a, 5b could be composed of any number of depletion mode n-channel transistors connected in a serial and/or parallel arrangement. In another example, the DCB 5, 5a, 5b could be a single depletion mode n-channel transistor, non-limiting examples including a depletion mode n-channel junction field effect transistor (JFET), a depletion mode n-channel metal oxide semiconductor field effect transistor (MOSFET), and a depletion mode insulated-gate bipolar transistor (IGBT).

The ECBs 6, 6a, 6b, 7, 7a, 7b described herein could include a variety of single and multi-element devices. In one example, the ECBs 6, 6a, 6b, 7, 7a, 7b could include any number of enhancement mode n-channel transistors connected in a serial or parallel arrangement. An ECB 6, 6a, 6b, 7, 7a, 7b in its simplest form could be a single enhancement mode n-channel transistor, non-limiting examples including an enhancement mode n-channel junction field effect transistor (JFET), an enhancement mode n-channel metal oxide semiconductor field effect transistor (MOSFET), and an enhancement mode insulated-gate bipolar transistor (IGBT).

Figure 1C:
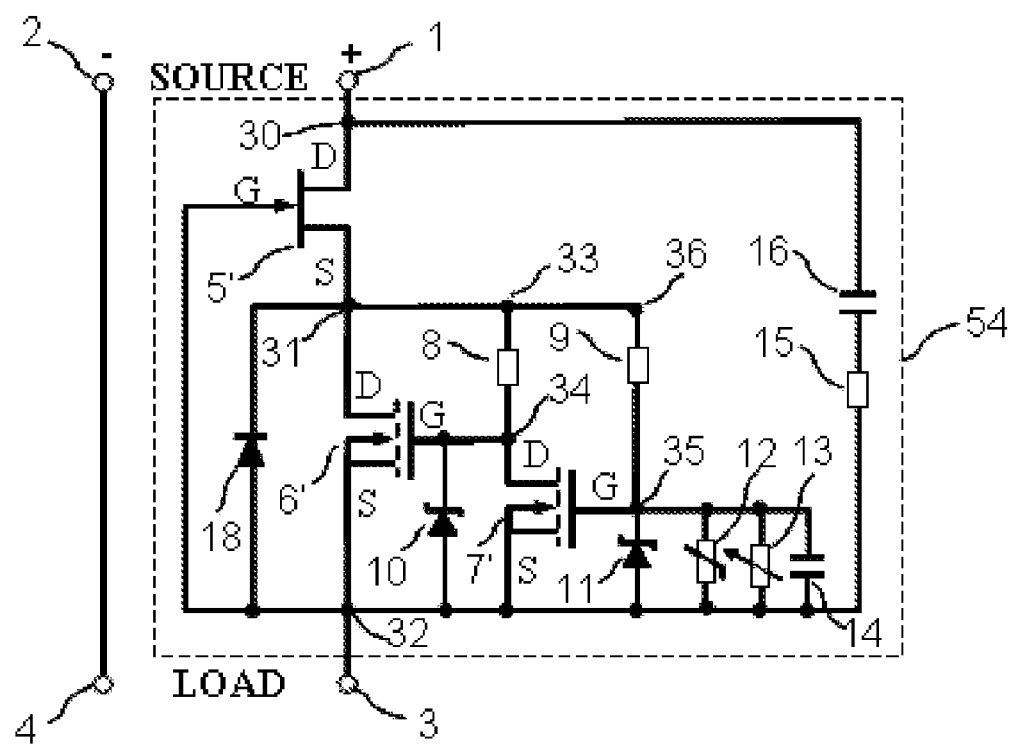
FIG. 1c is a circuit diagram illustrating the solid-state protection device from FIG. 1b wherein the depletion mode circuit block is a depletion mode n-channel JFET and the enhancement mode circuit blocks are each an enhancement mode MOSFET in accordance with an embodiment of the invention.

Referring now to FIG. 1c, the protection device 54 is shown whereby the DCB 5 is a depletion mode n-channel JFET and the ECBs 6, 7 are each one enhancement mode MOSFET. Components and architecture are identical to those in FIG. 1b, except where otherwise noted. For example, the optional current bypass component 17 is not required because the depletion mode n-channel JFET has good current conduction performance from source-to-drain terminals. The functionality of the protection device 54 in FIG. 1c is similar to the protection device 52 in FIG. 1b, in that the protection device 54 is a unidirectional device capable of preventing a surge current that exceeds a preset trip current to cross from terminal 1 to terminal 3 and disconnecting the load from a voltage surge.

The ECBs 6, 6a, 6b, 7, 7a, 7b described herein generally have a gate-to-source voltage larger than the threshold voltage required to turn ON the circuit block. The higher the gate-to-source voltage is, the lower the ON-state voltage drop for the same current level is. For the first ECB 6 in FIG. 1b, the ON-state voltage drop is fed back to its gate to keep the ECB 6 in its ON-state. In general applications, it is desired that the ON-state voltage drop of the first ECB 6 to be as low as possible so as to reduce power loss. Therefore, the first ECB 6 should have a positive but low threshold voltage.

Figure 2A:
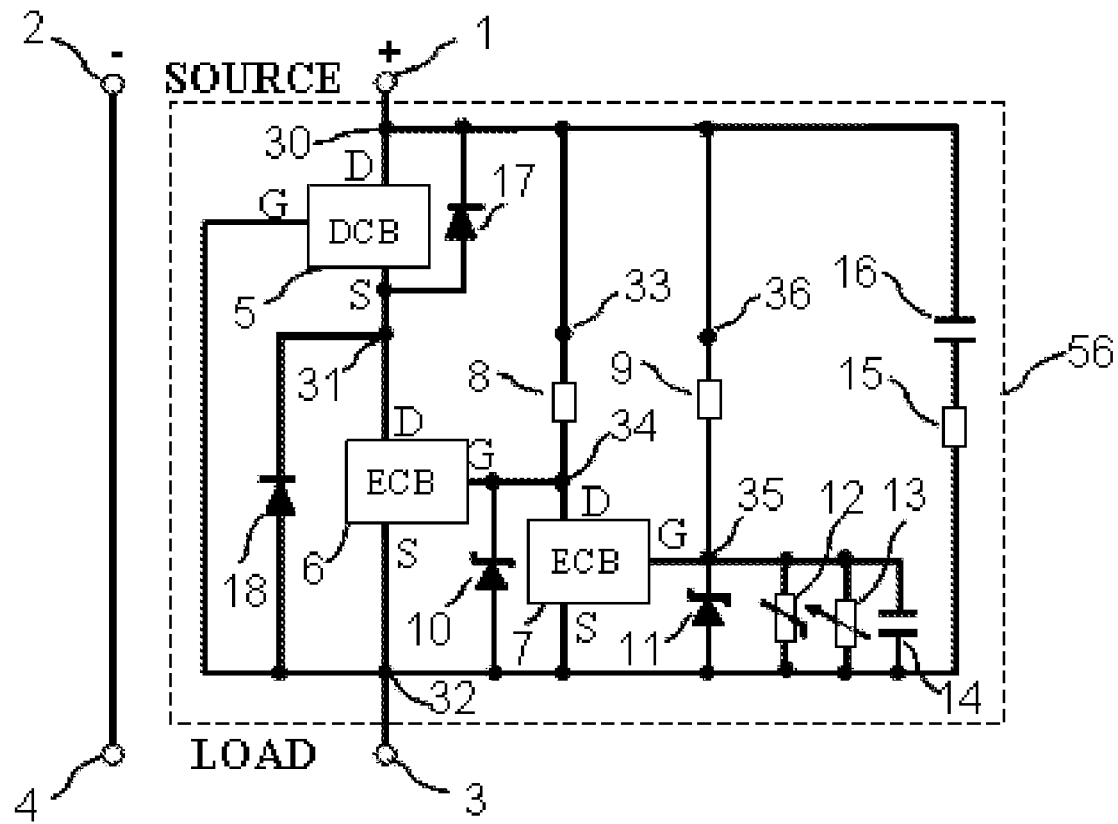
FIG. 2a is a circuit diagram illustrating alternate connectivity of the CLLs in the solid-state protection device from FIG. 1b in accordance with an embodiment of the invention.

FIGS. 2a-2d describe several alternate embodiments of the protection device 52 in FIG. 1b. Components and architecture are identical to those in FIG. 1b, except where otherwise noted. The protection devices 56, 58, 60, and 61 allow bidirectional current conduction, although the protection function is unidirectional. Operation of the protection devices 56, 58, 60, and 61 are similar to that of the protection device 52 of FIG. 1b. The circuit in FIG. 2a is a preferred embodiment.

Referring now to FIG. 2a, an improved embodiment the protection device 56 is shown which reduces the ON-state voltage drop of the first ECB 6 in FIG. 1b. The fourth node 33 and seventh node 36 are now connected to the first node 30 rather than to second node 31. As such, the entire voltage drop across the protection device 56, including the voltage drop across the drain and source terminals of the DCB 5 and across the drain and source terminals of the first ECB 6, is employed to bias the gate and source terminals of the first ECB 6. For the same level of current conducting through the protection device 56, the voltage available to bias the gate and source terminals of the first ECB 6 in FIG. 2a is much larger than that in FIG. 1b. Therefore, the forward voltage drop of the first ECB 6 in FIG. 2a is smaller than the forward voltage drop of the first ECB 6 in FIG. 1b. Accordingly, the ON-state forward voltage drop or the insertion loss of the protection device 56 is smaller than that of the previously described protection device 52.

Referring again to FIG. 2a, the voltage drop across the gate and source terminals of the second ECB 7 is much larger than that in FIG. 1b for the same current level because of the connection of the seventh node 36 to first node 30. This allows the threshold voltage of the second ECB 7 in FIG. 2a to be larger than that in FIG. 1b. A larger threshold voltage in practice is easier to achieve.

Referring again to FIG. 2a, the voltage limiting component 11 is required to prevent the gate-source terminals of the second ECB 7 from being exposed to a damaging high voltage, and second CLL 9 is required to support most of the voltage drop across the protection device 56 and to limit the current flowing through the voltage limiting component 11 after the protection device 56 is tripped into the blocking OFF-state. The CLL 8 will also support most of the voltage drop across protection device 56 and limit the current flowing through the second ECB 7 and the voltage limiting component 10 after the protection device 56 is tripped into the blocking OFF-state. A resistor with a predetermined value of resistance could be employed as the CLL 8 and second CLL 9; however, a dynamic load formed by a circuit block is otherwise preferred, as described herein. The CLL 8 and second CLL 9 are preferred to be a depletion-mode transistor and a feedback resistor as shown in FIG. 1a, except in this embodiment the depletion-mode transistor should have a voltage blocking capability similar to that of the DCB 5, because the CLLs 8, 9 could be subject to a high surge voltage. The transistors of the CLL 8 and second CLL 9 do not require high current capability because high current is not gene rally conducted through these elements.

The operation of the protection device 56 in FIG. 2a is similar to the protection device 52 in FIG. 1b. As illustrated in FIG. 2a, the source or supply voltage is connected across terminals 1 and 2 with the polarity shown and the load is connected across terminals 3 and 4. In normal operation, both the DCB 5 and first ECB 6 are ON, and the second ECB 7 is OFF. When a surge current enters from terminal 1 to terminal 3, the voltage drop across protection device 56 will momentarily increase, resulting in a momentary increase in the voltage drop across the gate and source terminals of the second ECB 7. Thereafter, the second ECB 7 turns ON when the voltage drop across its gate and source terminals reaches the threshold voltage of the second ECB 7. After the second ECB 7 is turned ON, the voltage drop across its drain and source terminals decreases until it is lower than the threshold voltage of the first ECB 6 so that the first ECB 6 is turned OFF. Once the first ECB 6 is OFF, the voltage drop across the drain and source terminals of the first ECB 6 increases substantially which in turn turns OFF the DCB 5 to block the surge voltage, which could be up to thousands or tens of thousands of volts. The result is that the protection device 56 effectively isolates the load from the supply voltage and any damaging current and voltage.

Figure 2B:
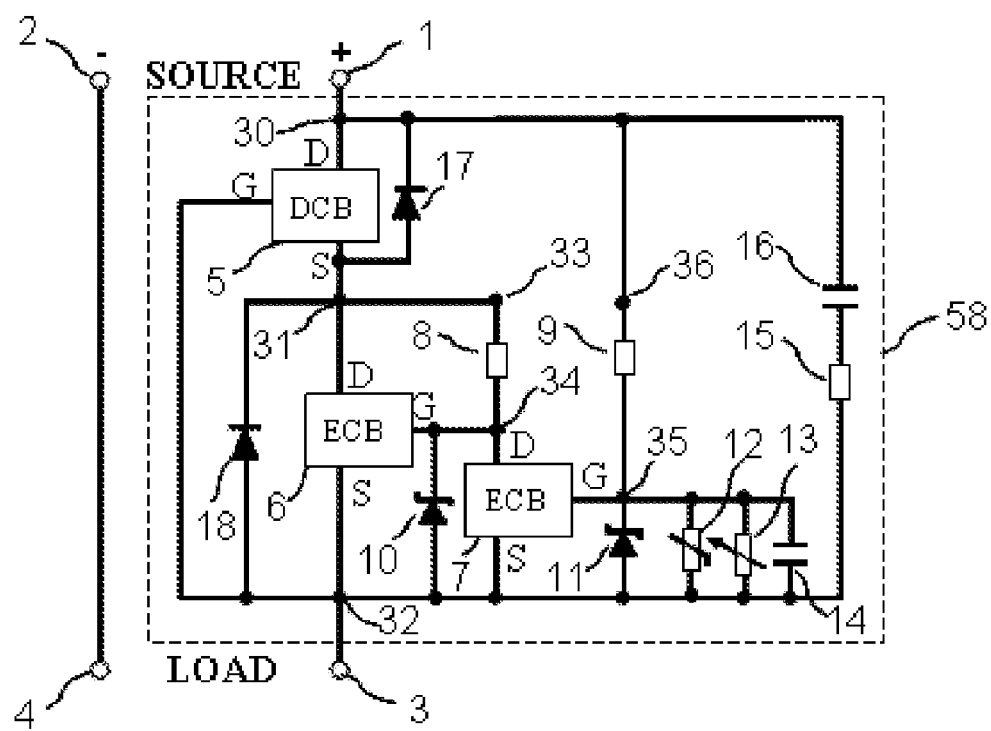
FIG. 2b is a circuit diagram illustrating alternate connectivity of the CLLs in the solid-state protection device from FIG. 1b in accordance with an embodiment of the invention.

Referring now to FIG. 2b, the fourth node 33 is now connected to the second node 31 and the seventh node 36 is connected to the first node 30. The protection device 58 does not necessarily have a better insertion loss than the device in FIG. 1b, but rather allows the threshold voltage of the second ECB 7 to be much larger than in FIG. 1b.

Figure 2C:
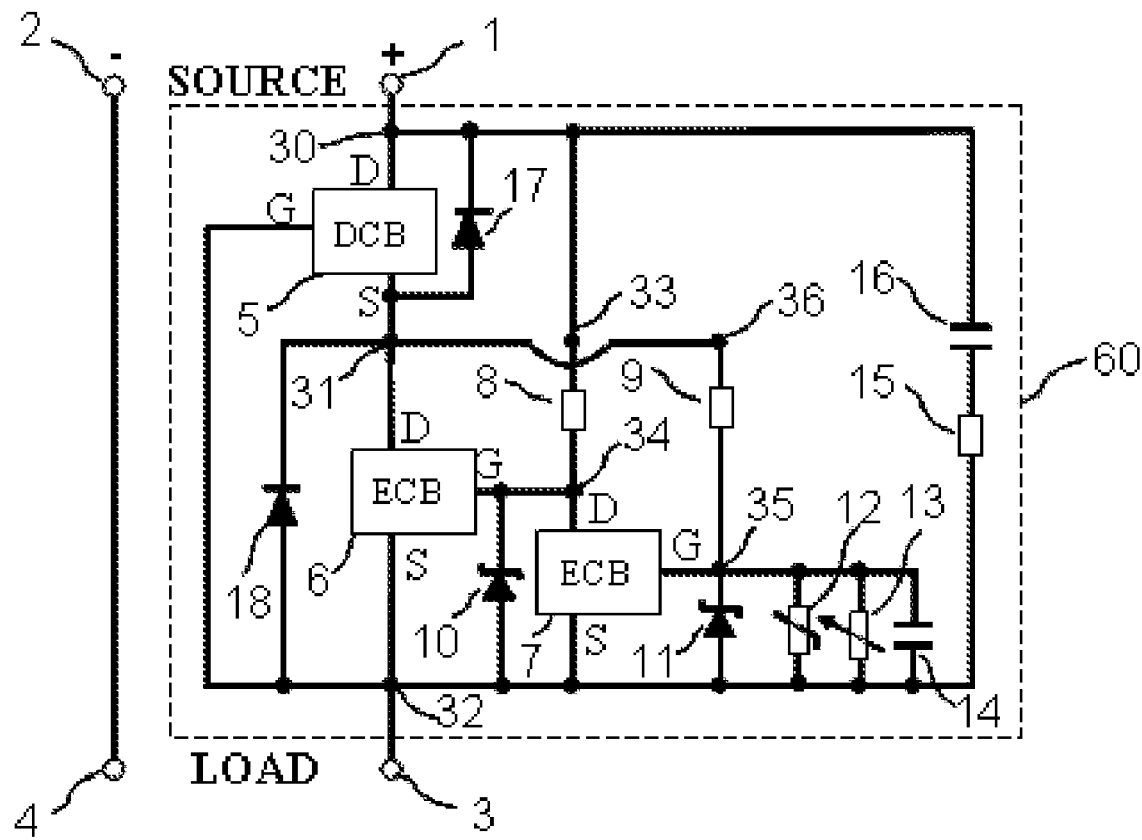
FIG. 2c is a circuit diagram illustrating alternate connectivity of the CLLs in the solid-state protection device from FIG. 1b in accordance with an embodiment of the invention.

Referring now to FIG. 2c, the seventh node 36 is now connected to the second node 31 and the fourth node 33 is connected to the first node 30. The protection device 60 improves the insertion loss otherwise achievable by the protection device 52 in FIG. 1b.

Figure 2D:
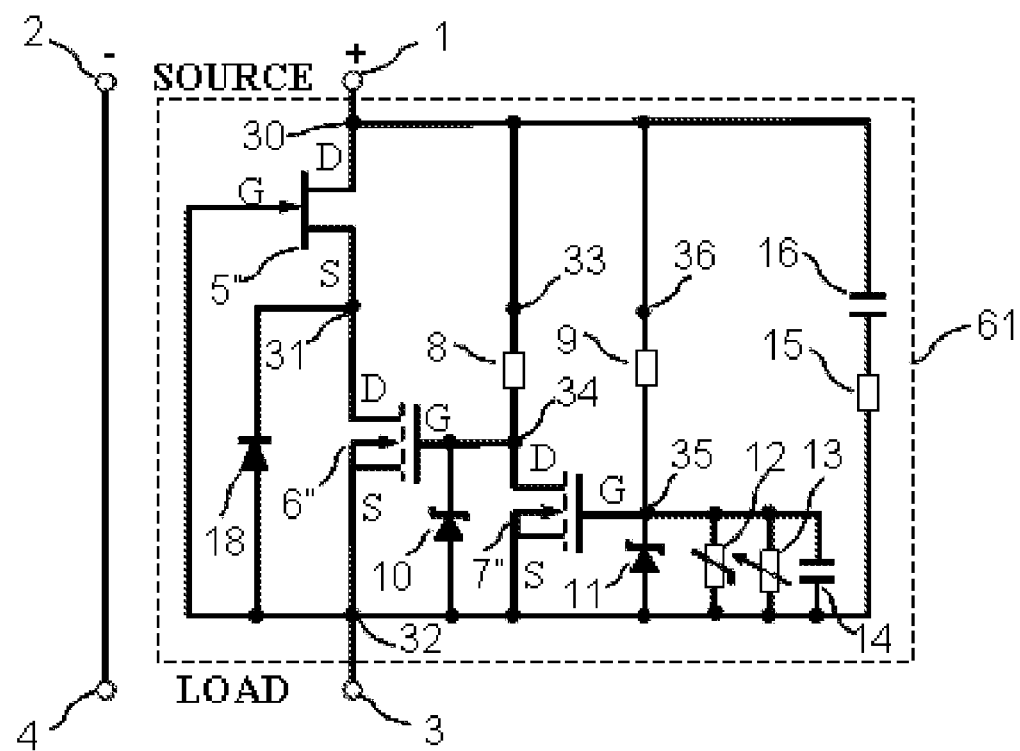
FIG. 2d is a circuit diagram illustrating an alternate configuration of the solid-state protection device in FIG. 2a wherein the depletion mode circuit block is a depletion mode n-channel JFET and the enhancement mode circuit blocks are each an enhancement mode MOSFET in accordance with an embodiment of the invention.

Referring now to FIG. 2d, the protection device 56 in FIG. 2a is shown with a depletion mode n-channel JFET at the DCB 5 and an enhancement mode MOSFET at the first ECB 6 and second ECB 7. The current bypass component 17 in FIG. 2a is not required because the depletion mode n-channel JFET has good current conduction capability from source-to-drain terminals.

Bidirectional power systems, one non-limiting example being a bidirectional DC-DC converter, are gaining increased attentions in a wide range of applications including hybrid and electric vehicles where a battery delivers and receives energy. Bidirectional power systems require bidirectional protection devices. In accordance with embodiments of the invention, a bidirectional protection device could be constructed with two unidirectional protection devices.

Figure 3A:
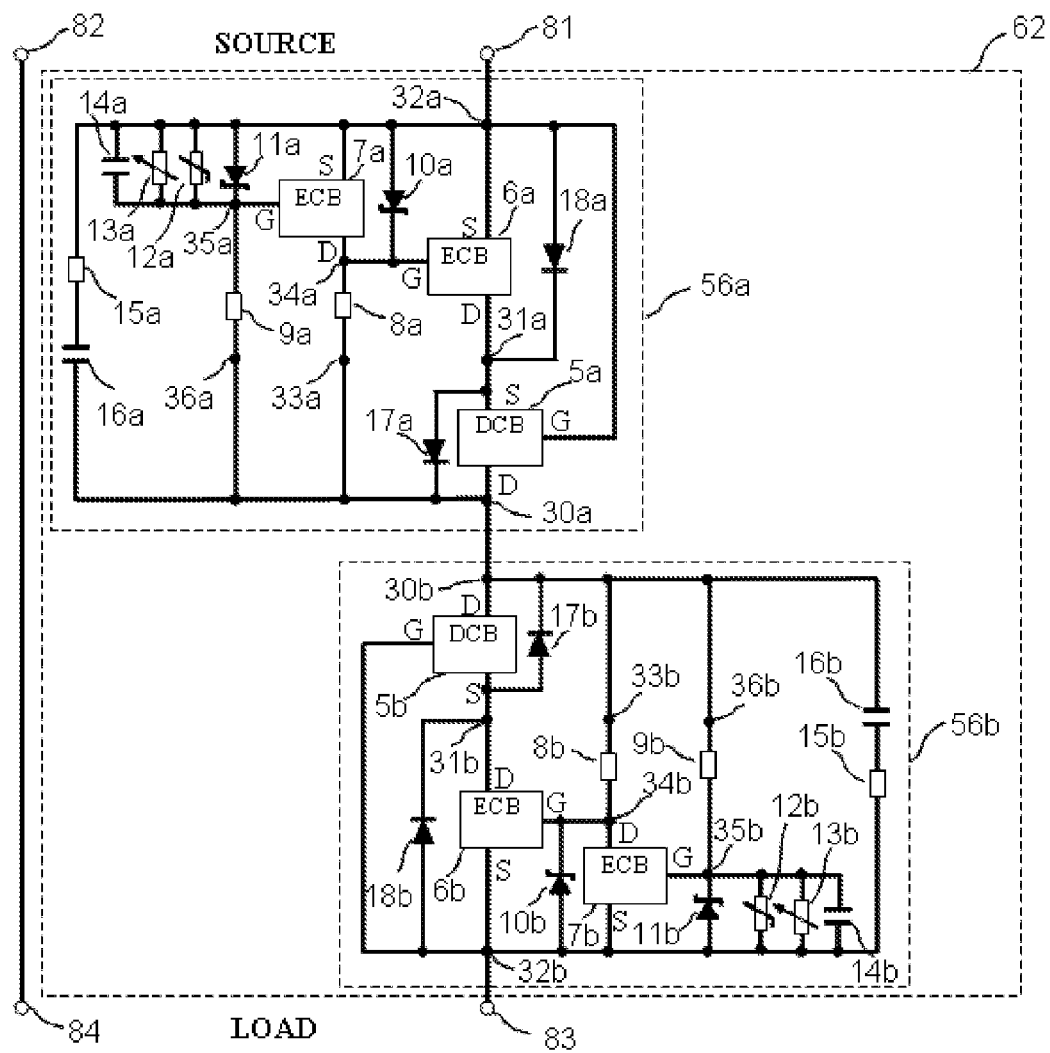
FIG. 3a is a circuit diagram illustrating a bidirectional protection device including a pair of solid-state protection devices from FIG. 2a connected in a serial arrangement in accordance with an embodiment of the invention.

Referring now to FIG. 3a, a bidirectional protection device 62 is shown constructed with two protection devices 56a, 56b, as described in FIG. 2a. A bidirectional source or supply voltage is connected across terminals 81 and 82 and a load is connected across terminals 83 and 84. The bidirectional protection device 62 is capable of protecting both load and source from excessive positive and negative current and voltage surges.

The protection device 56b is identical in its construction to the protection device 56 in FIG. 2a and similar in operation thereto in that it is operative to limit the positive surge current conducting from terminal 81 to terminal 83. The protection device 56b includes notation similar to that in FIG. 2a to identify the various components and nodes, except that the reference numerals for are distinguished by the suffix "b".

The protection device 56a is identical in its construction to the protection device 56 in FIG. 2a and operates in a similar manner to the protection device 56b, except that it is responsive to limit the negative surge of current from terminal 83 to terminal 81. The protection device 56a includes notation similar to that in FIG. 2a to identify the various components and nodes, except that the reference numerals for are distinguished by the suffix "a".

Referring again to FIG. 3a, the relative positions of the protection devices 56a and 56b could be transposed, meaning one protection device 56a is closer to the load than the other protection device 56b, the third node 32a is connected to the other third node 32b, the first node 30a is connected to one terminal 83 instead of to the first node 30b, and the first node 30b is connected to the other terminal 81. However, it is preferred that the first node 30a and other first node 30b be connected together as illustrated in FIG. 3a, because the ON resistance of the bidirectional protection device 62 could be improved, as discussed herein.

Figure 3B:
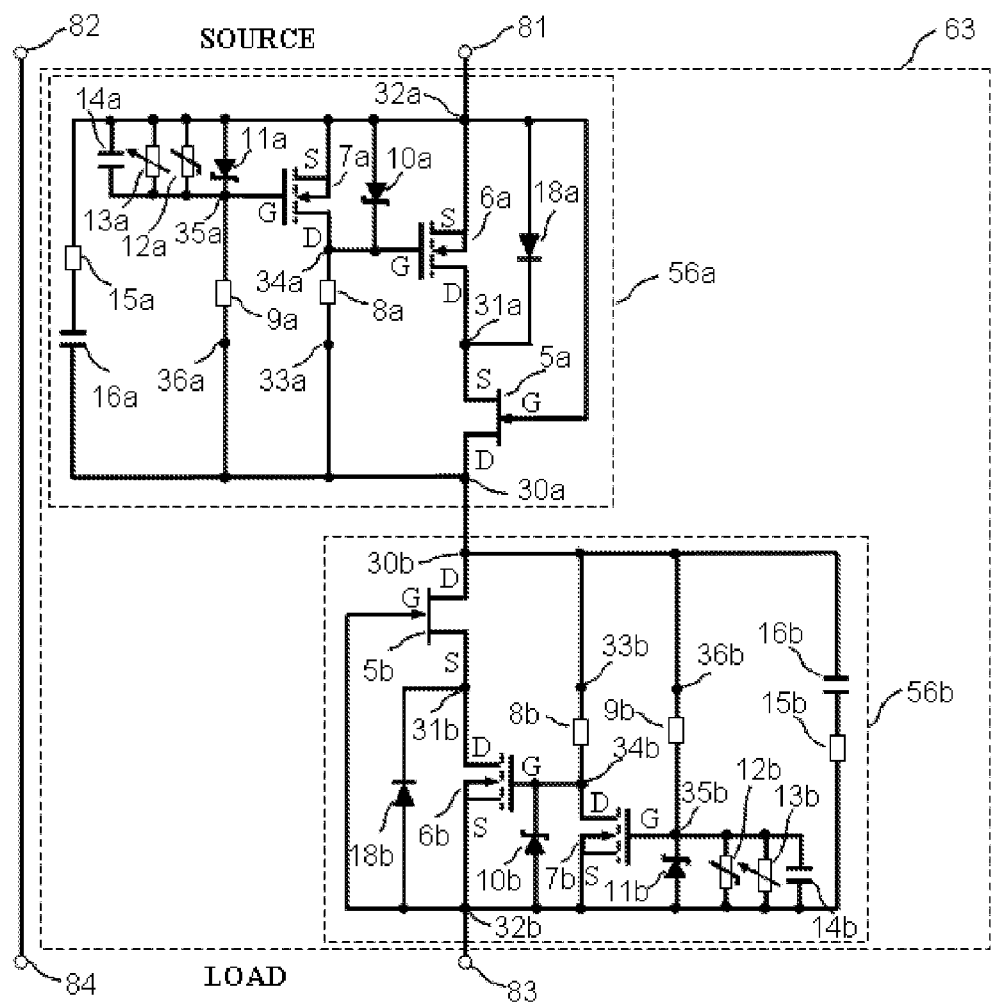
FIG. 3b is a circuit diagram illustrating a bidirectional protection device including a pair of solid-state protection devices from FIG. 2d connected in a serial arrangement in accordance with an embodiment of the invention.

Referring now to FIG. 3b, the bidirectional protection device 63 includes the bidirectional protection device 62 in FIG. 3a wherein the DCBs 5a, 5b are each a depletion mode n-channel JFET and the ECBs 8a, 8b, 9a, 9b are each an enhancement mode MOSFET. Components and architecture are otherwise identical to the bidirectional protection device 62, except where otherwise noted. For example, the current bypass components 17a and 17b in the bidirectional protection device 62 are not required because of the conduction properties of the depletion mode n-channel JFET from source to drain terminals. Operation of the bidirectional protection device 63 is similar to that of the device in FIG. 3a.

The ON-resistance or insertion loss of the bidirectional protection device 62 in FIG. 3a could be reduced where the total voltage drop across the protection devices 56a, 56b is used to bias the gates of the first ECBs 6a, 6b.

Figure 4A:
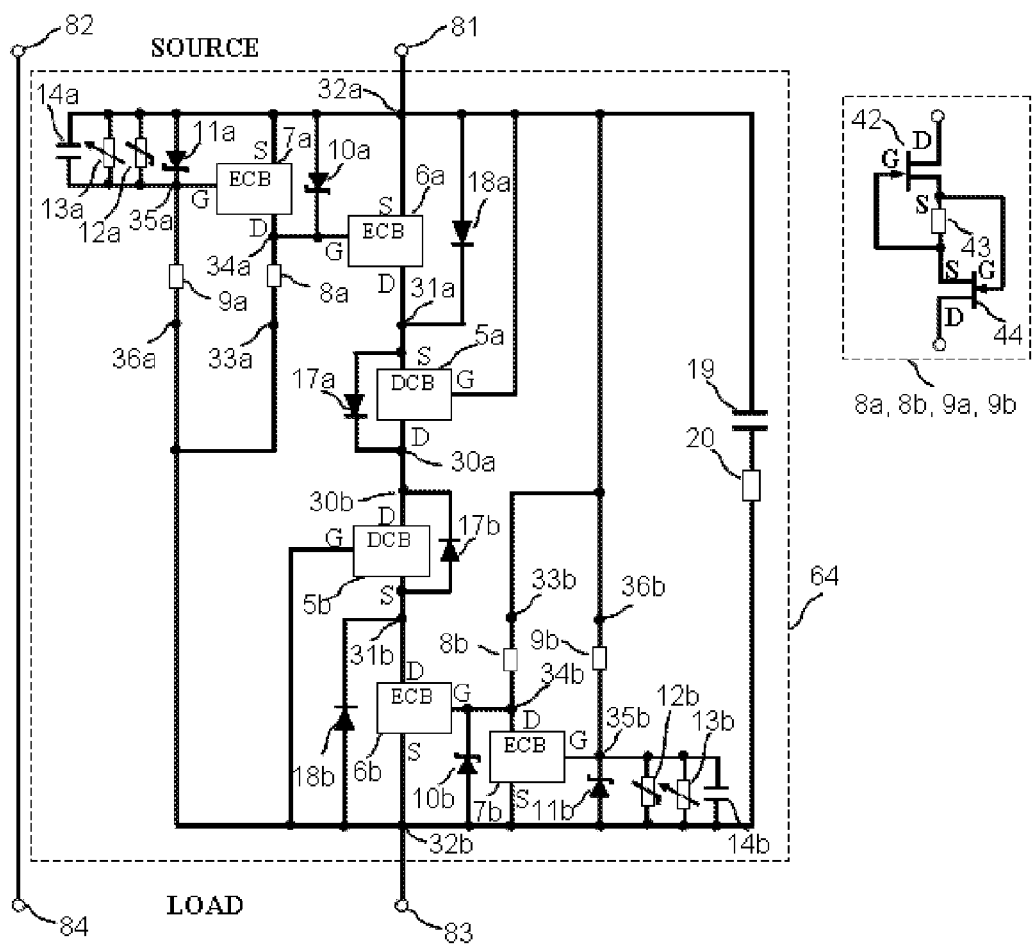
FIG. 4a is a circuit diagram illustrating an alternate configuration of the bidirectional protection device from FIG. 3a in accordance with an embodiment of the invention.
Figure 4B:
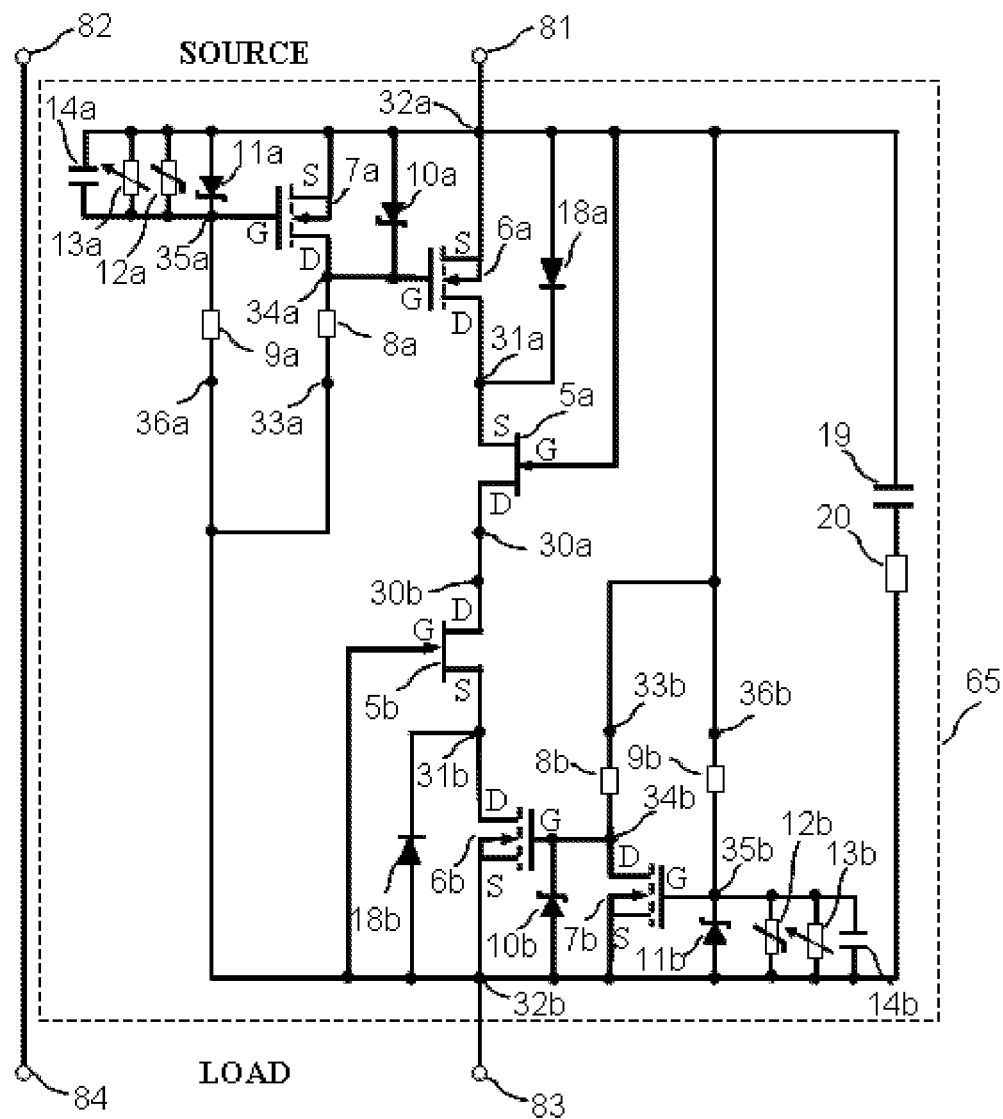
FIG. 4b is a circuit diagram illustrating an alternate configuration of the bidirectional protection device from FIG. 3b in accordance with an embodiment of the invention.

FIGS. 4a and 4b show two possible embodiments of a bidirectional protection device 64 and 65, respectively, that separately prevents a surge current that exceeds a preset tripping current from passing through the device and disconnects a load in response to a voltage surge.

Referring now to FIG. 4a, the bidirectional protection device 64 is shown based on the protection device 62 in FIG. 3a. Components, nodes, and architecture are identical to that in FIG. 3a, except where otherwise noted. For example, the two optional RC networks of FIG. 3a, each including a resistor 15a or 15b and a capacitor 16a or 16b, are combined into one optional RC network in FIG. 4a, formed by a capacitor 19 and a resistor 20 connected parallel to the third nodes 32a, 32b. The fourth node 33b and seventh node 36b are connected to the third node 32a rather than to the first node 30b in FIG. 3a. The fourth node 33a and seventh node 36a are connected to the third node 32b rather than to the first node 30a in FIG. 3a. In other embodiments, it is possible for only the fourth node 33b or seventh node 36b to be connected to the third node 32a and/or for only the fourth node 33a or seventh node 36a to be connected to the third node 32b.

Referring again to FIG. 4a, the CLLs 8a, 8b, 9a, and 9b should allow for bidirectional current limiting and high voltage handling. In some embodiments, the CLLs 8a, 8b, 9a, 9b could each be implemented as a simple current limiting resistor. However, it is preferred that each CLL 8a, 8b, 9a, 9b include a pair of depletion mode FETs 42, 44 and a shared resistor 43, as shown in FIG. 4a. This arrangement ensures that the resistance of each CLL 8a, 8b, 9a, 9b is low when the voltage across each CLL 8a, 8b, 9a, 9b is low so as to achieve a small RC charging time and a high resistance when the voltage across each CLL 8a, 8b, 9a, 9b is high so as to limit leakage current when the bidirectional protection device 64 is in the blocking or OFF state. While JFETs are illustrated in FIG. 4a, any depletion mode transistor, non-limiting examples including MOSFETs and IGBTs, are applicable to the CLLs 8a, 8b, 9a, 9b.

Referring again to FIG. 4a, the entire voltage drop across the bidirectional protection device 64 is applied to the gate of the first ECB 6b to reduce its ON resistance when current flows from one terminal 81 to another terminal 83. Similarly, when current flows from one terminal 83 to another terminal 81, the entire voltage drop across the bidirectional protection device 64 is applied to the gate of first ECB 6a to reduce its ON resistance. The increased gate-to-source bias voltage lowers the conduction power loss by reducing the conduction voltage drop of the first ECBs 6a, 6b.

Referring again to FIG. 4a, the bidirectional protection device 64 is functionally similar to the bidirectional protection device 62 in FIG. 3a. When current flows from one terminal 83 to another terminal 81 under normal operating conditions, the DCB 5a and first ECB 6a are in the ON-state and the DCB 5b and first ECB 6b are in a reverse conduction state. Conversely, when current flows from one terminal 81 to another terminal 83, the DCB 5b and first ECB 6b are in the ON-state and the DCB 5a and first ECB 6a are in the reverse conduction state. If any of the DCBs 5a, 5b and/or first ECBs 6a, 6b has either poor or no reverse current conduction capability, the reverse current flows through the appropriate current bypass component 17a, 17b, 18a, 18b.

If surge current flows from terminal 81 to terminal 83, then the voltage drop across the bidirectional protection device 64, between nodes 32a and 32b, will momentarily increase, resulting in an increase in the gate-to-source bias voltage at the second ECB 7b. The second ECB 7b is turned ON at a predetermined surge current, dependent on the threshold voltage of the component. Once the second ECB 7b is turned ON, the voltage across the drain and source terminals of the second ECB 7b decreases to a very small value below the threshold voltage of the first ECB 6b so that the first ECB 6b is turned OFF. The shut-off of the first ECB 6b causes a large voltage drop across the drain and source of the first ECB 6b, which is provided as a reverse bias to the gate-to-source terminals of the DCB 5b to choke off its conducting channel and turn OFF the DCB 5b. As a result, the bidirectional protection device 64 then disconnects the load from the surge current and voltage. The surge voltage is mainly supported by the high voltage DCB 5b, which, depending on the application, could be a single SiC FET capable of blocking up to and over 10,000 volts and conducting milli-amperes to thousands of amperes. Similarly, if a surge current flows from terminal 83 to terminal 81, the second ECB 7a is turned ON, depending on the threshold voltage the component, at a predetermined surge current causing the first ECB 6a and DCB 5a to turn OFF so that the bidirectional protection device 64 disconnects the load from the surge current and voltage, and the high voltage drop across the bidirectional protection device 64 is mainly supported by the high-voltage DCB 5a which, depending on applications, could also be a single SiC FET sufficiently capable of blocking over 10,000 volts and conducting milli-amperes to thousands of amperes. The bidirectional protection device 64 resumes normal operation automatically once the voltage drop across the device decreases to a value that turns OFF either of the second ECBs 7a, 7b after the fault causing current surge is cleared.

Referring now to FIG. 4b, a bidirectional protection device 65 is shown based on the bidirectional protection device 64 from FIG. 4a, wherein the DCBs 5a, 5b each include one depletion mode n-channel JFET and the first and second ECBs 6a, 6b, 7a, 7b each include one enhancement mode n-channel MOSFET. Components and architecture are otherwise identical to the bidirectional protection device 64 in FIG. 4a, except where otherwise noted. The optional current bypass components 17a, 17b are not required because of the current conduction capability of the depletion mode n-channel JFET. The operation of the bidirectional protection device 65 is similar to the bidirectional protection device 64 in FIG. 4a.

With reference to FIGS. 5a, 5b, 6, 7, 8, and 9, the bidirectional protection system 65 in FIG. 4b was simulated with the PSpice® computer program, sold by Cadance Design Systems, Inc. of San Jose, Calif. For simplicity, the optional RC network including the capacitor 19 and resistor 20, the optional capacitors 14a, 14b, and the optional variable resistors 13a, 13b were not included in the simulations. Performance plots are for illustrative purposes only and are not intended to limit or otherwise restrict the scope of the embodiments described herein and their performance.

Figure 5A:
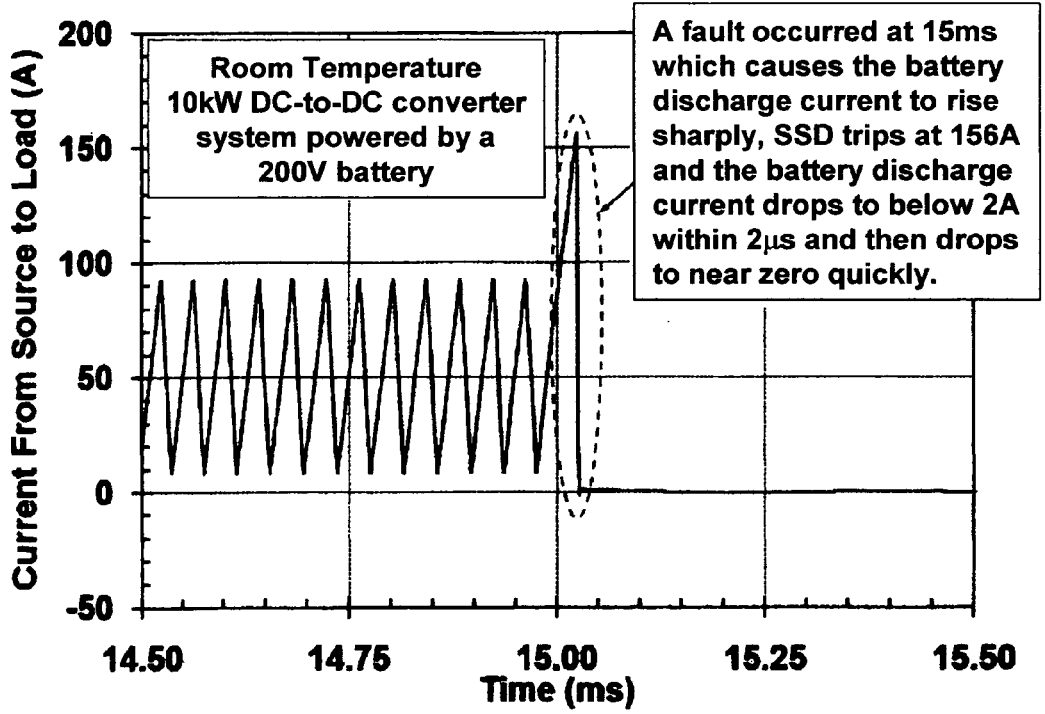
FIG. 5a is a plot illustrating the simulated current waveform in expanded scale produced by the bidirectional protection device in FIG. 4b protecting a single-phase 10-kilowatt DC-to-DC converter system powered by a 200 volt battery when a fault causes the battery discharge current to rise sharply.
Figure 5B:
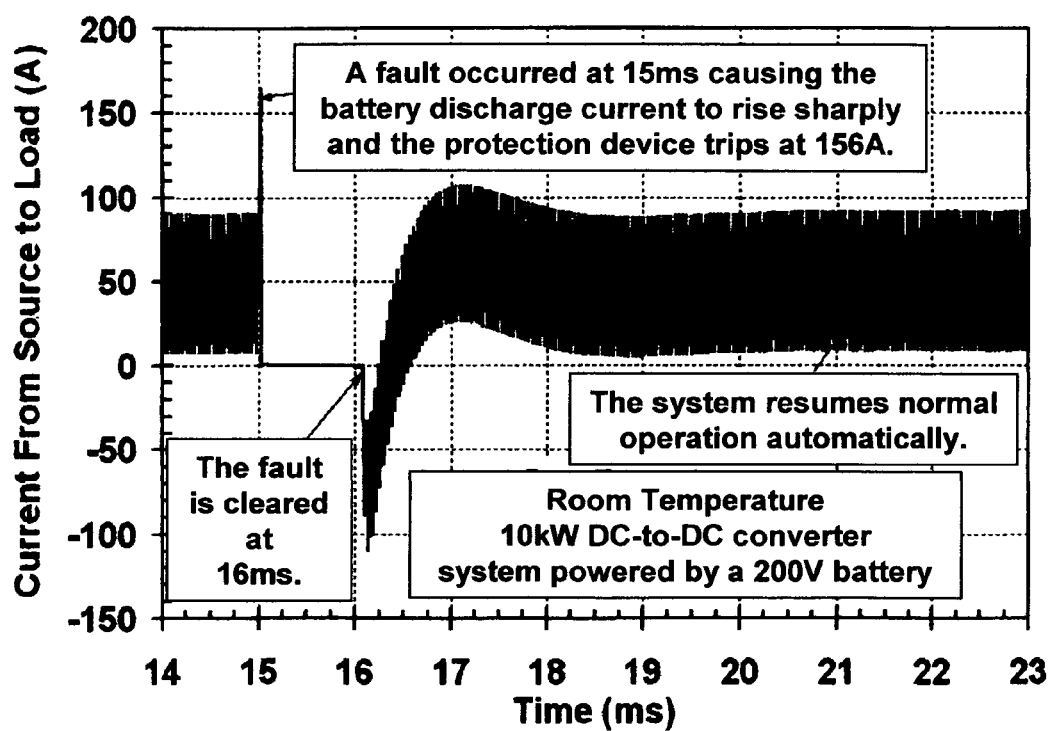
FIG. 5b is a plot illustrating the simulated current waveform produced by the bidirectional protection device in FIG. 4b protecting a single-phase 10-kilowatt DC-to-DC converter system powered by a 200 volt battery when a fault causes the battery discharge current to rise sharply and after the system resumes normal operation after the fault is cleared.

Referring now to FIGS. 5a and 5b, current versus time plots are shown for the bidirectional protection device 65 connected in series between a 200 volt battery and a single-phase 10 kilowatt DC-to-DC converter system powered by the 200 volt battery when a fault, such as a short circuit of the power transistor in the DC-DC converter, causes the battery discharge current to rise sharply. The current is tripped at a pre-designed level of 156 amperes and drops to below 2 amperes within 2 microseconds and then quickly drops to near zero, as shown in FIG. 5a. After the fault is cleared, the system automatically resumes normal operation, as shown in FIG. 5b.

Figure 6:
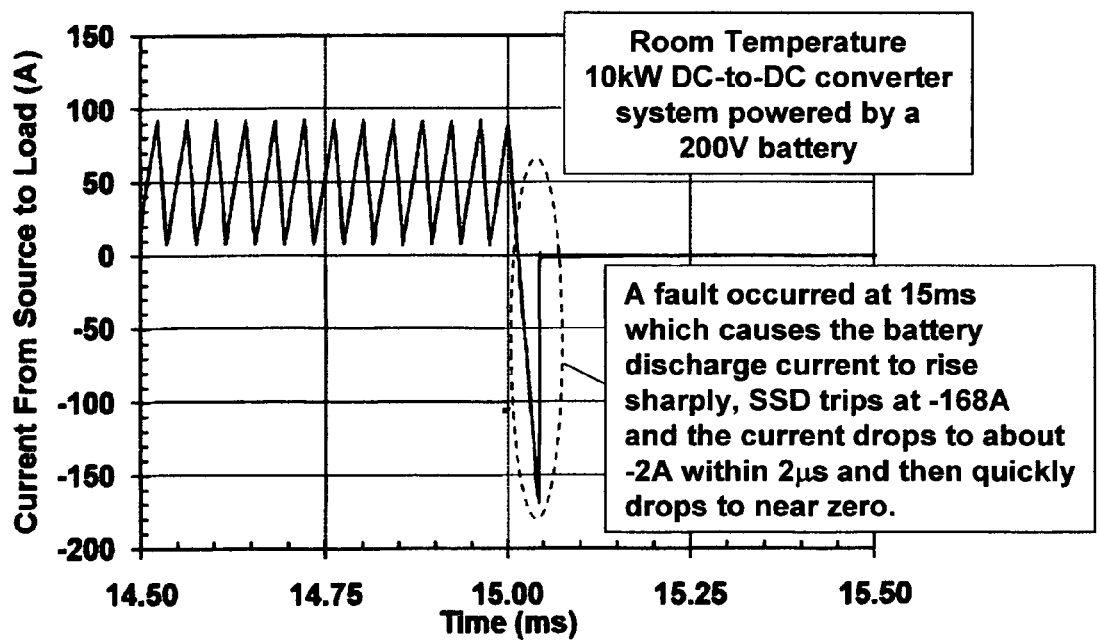
FIG. 6 is a plot illustrating the simulated current waveform in expanded scale produced by the bidirectional protection device in FIG. 4b protecting a single-phase 10-kilowatt DC-to-DC converter system powered by a 200 volt battery when a fault causes the battery charge current to rise sharply.

Referring now to FIG. 6, a current versus time plot is shown for the bidirectional protection device 65 connected in series between a 200 volt battery and a single-phase 10 kilowatt DC-to-DC converter system powered by the 200V battery when a fault, such as a short circuit of the other power transistor in the DC-DC converter, causes the battery charge current to rise sharply. In this example, the current is tripped at −168 amperes and drops to about −2 amperes within 2 microseconds and then quickly drops to near zero.

The simulated results in FIGS. 5a, 5b, and 6 demonstrate that the bidirectional protection device 65 operates at a very high speed and is capable of automatically resuming normal operation once the voltage drop across the device between the nodes 32a and 32b decreases to a value that turns OFF either of the second ECBs 7a or 7b after the fault is cleared.

Figure 7:
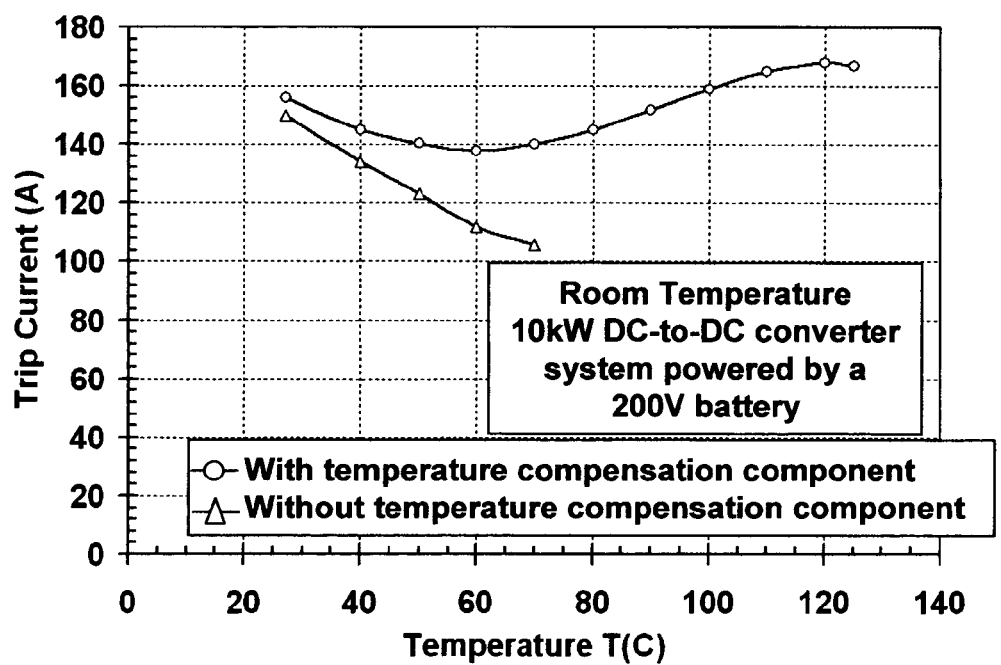
FIG. 7 is a plot illustrating the effects of temperature compensation components on the trip current of the bidirectional protection device in FIG. 4b.

Referring now to FIG. 7, a trip current versus temperature plot is shown for the bidirectional protection device 65 with and without the temperature compensation components 12a, 12b. The trip current decreases sharply with an increase in temperature without the temperature compensation components 12a, 12b. The trip current is seen to be much less sensitive to the temperature variation over the range of 27° Celsius to 125° Celsius, when the temperature compensation components 12a, 12b are employed.

Figure 8:
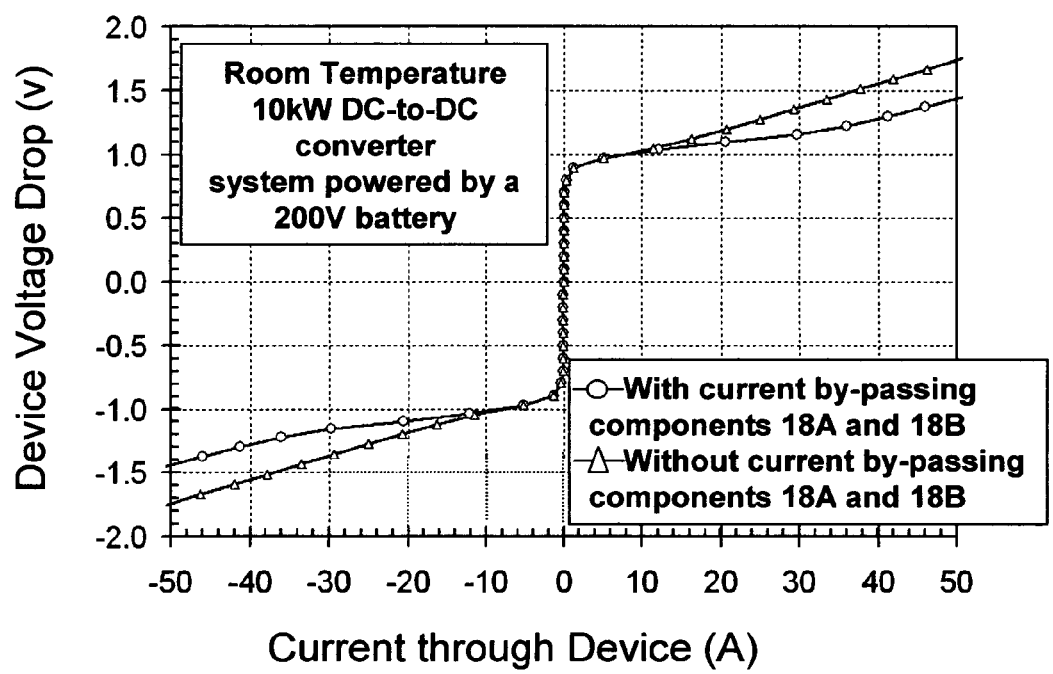
FIG. 8 is a plot illustrating the effects of current bypass components (power diodes) on reducing the forward voltage drop across the bidirectional protection device in FIG. 4b.

Referring now to FIG. 8, a voltage drop versus current plot is shown to illustrate the effects of power diodes as the current bypass components 18a, 18b on the forward voltage drop of the bidirectional protection device 65 for a 10 kilowatt, 200 volt system. With the power diodes, the forward voltage drop in normal operation is reduced by about 20% or 0.3 volts at the forward current up to 50 amperes. The reduced voltage drop is a direct result of the smaller ON-state voltage drop of the power diodes in comparison to that of MOSFETs as the first ECBs 6a and 6b. In general, a lower ON-state voltage drop correlates to a lower insertion loss.

Figure 9:
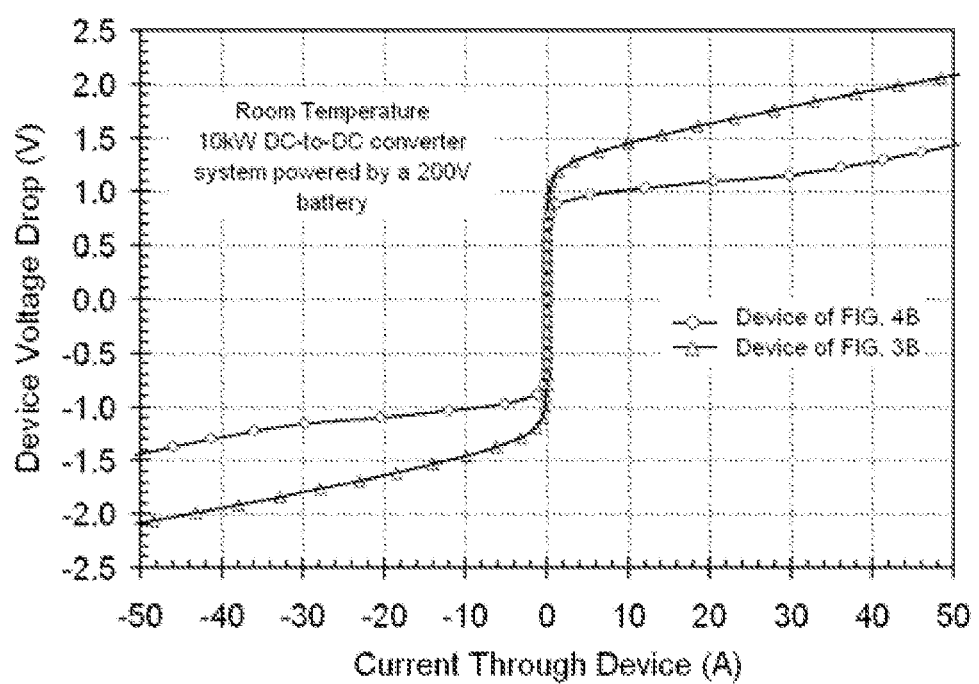
FIG. 9 is a plot illustrating the lower conduction voltage drop of the bidirectional protection device in FIG. 4b in comparison to the forward voltage drop of the bidirectional protection device in FIG. 3b.

Referring now to FIG. 9, a voltage drop versus current plot compares the forward voltage drop of the bidirectional protection devices 65 and 63 for a 10 kilowatt, 200 volt system. The bidirectional protection device 65 has a much smaller forward voltage drop as compared to the bidirectional protection device 63 in FIG. 3b. The substantial reduction in the forward voltage drop or insertion loss is due to the use of the entire voltage drop of the bidirectional protection device 65 to forward bias the gate-source terminals of first ECBs 6a, 6b.

Figure 10A:
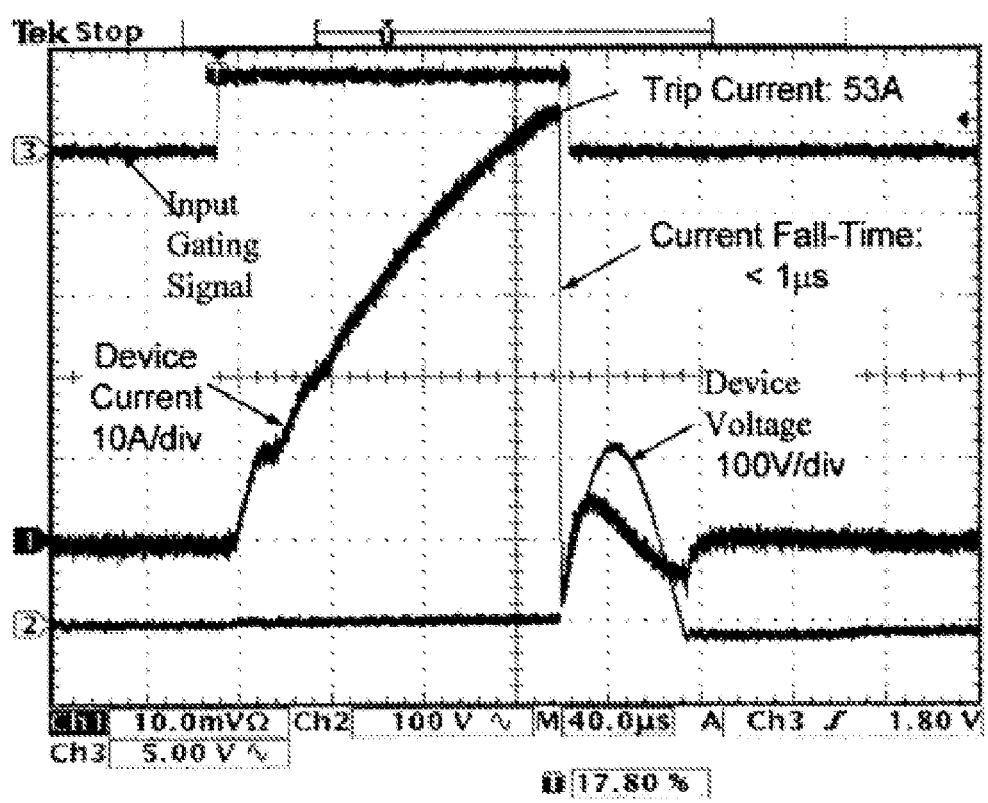
FIG. 10a is a plot illustrating the measured current tripping waveforms of the bidirectional protection device in FIG. 4b with a trip current of 53 amperes.
Figure 10B:
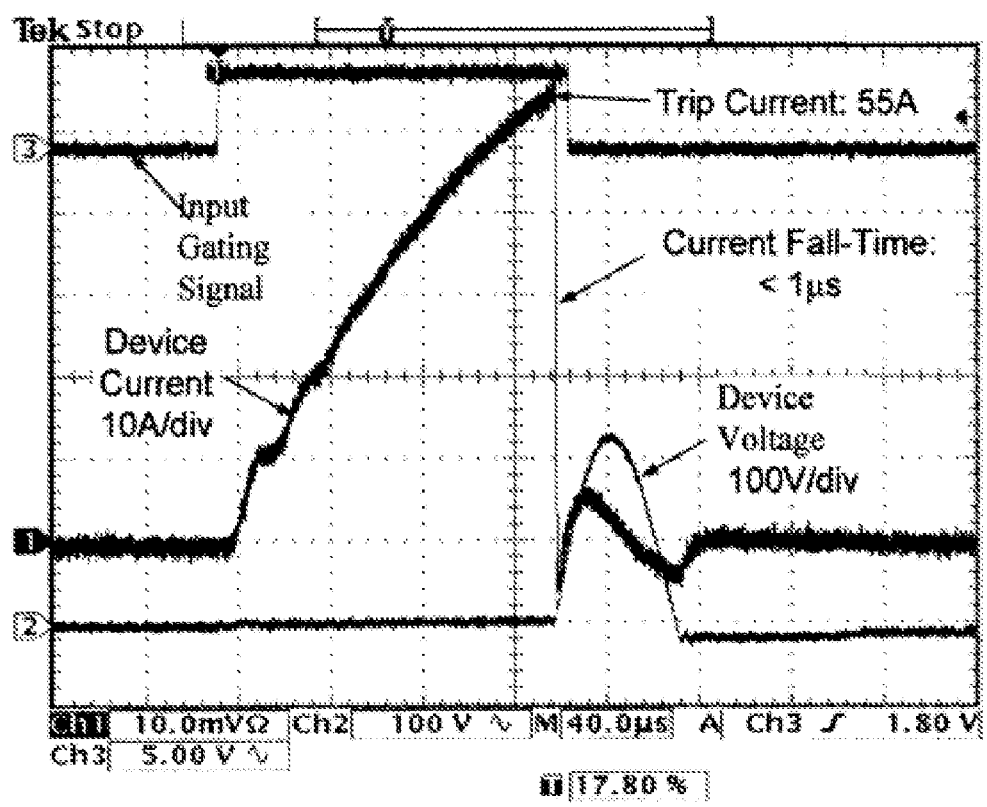
FIG. 10b is a plot illustrating the measured current tripping waveforms of the bidirectional protection device in FIG. 4b with a trip current of 55 amperes.

Referring now to FIGS. 10a, 10b, tripping current plots show exemplary current versus time plots for the bidirectional protection device 65 demonstrated experimentally for a 10 kilowatt DC-to-DC converter system powered by a 300 volt source. FIG. 10a shows the measured current tripping waveforms for the surge current flowing from terminal 81 to terminal 83. FIG. 10b shows the measured current tripping waveforms for the surge current flowing from terminal 83 to terminal 81. Experimental results show that the device has a trip current very close to the designed target of 50 amperes and has an extremely fast turn-off speed of less than 1 microsecond.

While depletion mode circuit blocks with a negative threshold voltage and enhancement mode circuit blocks with a positive threshold voltage based on n-channel devices are described herein, depletion mode circuit blocks with a positive threshold voltage and enhancement mode circuit blocks with a negative threshold voltage based on p-channel devices, could also be used; although, such embodiments are not preferred because of the large channel resistance of p-channel devices.

The voltage and current capability of the depletion mode circuit blocks and transistors described herein are chosen to meet specific protection requirements. For example, the protection devices are not generally required to protect against a very large current, but rather protect against very high voltages in many telecommunication applications. In another example, the protection devices for electric vehicle batteries are generally required to protect against a very large current, rather than very high voltages.

The description above indicates that a great degree of flexibility is offered in terms of the invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A protection device comprising:
   (a) a first current limiting load;
   (b) a second current limiting load;
   (c) a first circuit block being a depletion mode circuit with either a negative threshold voltage or a positive threshold voltage;
   (d) a second circuit block being a first enhancement mode circuit; and
   (e) a third circuit block being a second enhancement mode circuit, said third circuit block has a threshold voltage magnitude larger than said second circuit block;
   where said first circuit block, said second circuit block, and said third circuit block each has a drain terminal, a source terminal, and a gate terminal,
   said first circuit block connected in series with said second circuit block so that said source terminal of said first circuit block is connected to said drain terminal of said second circuit block,
   said drain terminal of said third circuit block is connected to said gate terminal of said second circuit block and further connected to said drain terminal of said second circuit block through said first current limiting load,
   said gate terminal of said third circuit block is connected to said drain terminal of said second circuit block through said second current limiting load,
   said gate terminal of said first circuit block is connected to said source terminals of said second circuit block and said third circuit block,
   a current path through said first circuit block and said second circuit block with said third circuit block controlling the ON and OFF status of said second circuit block and said second circuit block in turn controlling the ON and OFF status of said first circuit block.

2. The protection device of claim 1, wherein said first circuit block is at least one depletion mode n-channel transistor, and said second circuit block and said third circuit block is each at least one enhancement mode n-channel transistor.

3. The protection device of claim 2, further comprising:
   (f) a capacitor;
   (g) a variable resistor;
   (h) a temperature compensation component,
      where said capacitor, said variable resistor and said temperature compensation component are connected between said gate terminal and said source terminal of said third circuit block; and
   (i) a voltage limiting component connected to said source terminal and said gate terminal of each of said second circuit block and said third circuit block.

4. The protection device of claim 3, wherein said current limiting loads are dynamic resistors and said voltage-limiting components are Zener diodes.

5. The protection device of claim 4, wherein said dynamic resistors are each formed by a depletion mode transistor and a constant resistor, said constant resistor being connected between said gate terminal and said source terminals of said depletion mode transistor and being in the drain-to-source current path of said depletion mode transistor.

6. The protection device of claim 5, wherein said first circuit block is a depletion mode field-effect transistor, a depletion mode static induction transistor, or a depletion mode IGBT, and said second circuit block and said third circuit block are each an enhancement mode field-effect transistor, an enhancement mode static induction transistor, or an enhancement mode IGBT.

7. The protection device of claim 6, further comprising:
   (j) a current bypass diode connected to said source terminal and said drain terminal of said first circuit block and/or said second circuit block.

8. The protection device of claim 6, further comprising:
   (j) an RC network connected parallel to said protection device.

9. A protection device comprising:
   (a) a first current limiting load;
   (b) a second current limiting load;
   (c) a first circuit block being a depletion mode circuit with either a negative threshold voltage or a positive threshold voltage;
   (d) a second circuit block being a first enhancement mode circuit; and
   (e) a third circuit block being a second enhancement mode circuit, said third circuit block having a threshold voltage magnitude larger than said second circuit block;

where said first circuit block, said second circuit block, said third circuit block each has a drain terminal, a source terminal, and a gate terminal, said first circuit block connected in series with said second circuit block so that said source terminal of said first circuit block is connected to said drain terminal of said second circuit block, said drain terminal of said third circuit block connected to said gate terminal of said second circuit block and further connected to said drain terminal of said first circuit block through said first current limiting load, said gate terminal of said third circuit block connected to said drain terminal of said first circuit block through said second current limiting load, said gate terminal of said first circuit block connected to said source terminals of said second circuit block and said third circuit block, a current path through said first circuit block and second circuit block with said third circuit block controlling the ON and OFF status of said second circuit block and said second circuit block in turn controlling the ON and OFF status of said first circuit block.

10. The protection device of claim 9, wherein said first circuit block is at least one depletion mode n-channel transistor, said second circuit block is at least one enhancement mode n-channel transistor, and said third circuit block is at least one enhancement mode n-channel transistor.

11. The protection device of claim 10, further comprising:
(f) a capacitor;
(g) a voltage limiting component;
(h) a variable resistor; and
(i) a temperature compensation component;
where said capacitor, said variable resistor, and said temperature compensation component are connected between said source terminal and said gate terminal of said third circuit block and said voltage limiting component is connected between said source terminal and said gate terminal of each of said second circuit block and said third circuit block.

12. The protection device of claim 11, wherein said current limiting loads are dynamic resistors.

13. The protection device of claim 12, wherein said dynamic resistors are each formed by a depletion mode transistor and a constant resistor, said constant resistor being connected between said gate terminal and said source terminal of said depletion mode transistor and in the drain-to-source current path of said depletion mode transistor.

14. The protection device of claim 13, wherein said first circuit block is a depletion mode field-effect transistor, a depletion mode static induction transistor, or a depletion mode IGBT, and said second circuit block and said third circuit block are each an enhancement mode field-effect transistor, an enhancement mode static induction transistor, or an enhancement mode IGBT.

15. The protection device of claim 14, further comprising:
(j) a current bypass diode connected to said source terminal and said drain terminal of said first circuit block and/or said second circuit block.

16. The protection device of claim 15, further comprising:
(k) an RC network connected parallel to said protection device.

17. The protection device of claim 16, wherein said first current limiting load or said second current limiting load is connected at one end to said source terminal of said first circuit block and said drain terminal of said second circuit block.

18. A bidirectional protection device comprising:
(a) a first current limiting load;
(b) a second current limiting load;
(c) a third current limiting load;
(d) a fourth current limiting load;
(e) a first circuit block being a depletion mode circuit with either a negative threshold voltage or a positive threshold voltage;
(f) a second circuit block being an enhancement mode circuit;
(g) a third circuit block being an enhancement mode circuit;
(h) a fourth circuit block being a depletion mode circuit with either a negative threshold voltage or a positive threshold voltage;
(i) a fifth circuit block being an enhancement mode circuit; and
(j) a sixth circuit block being an enhancement mode circuit;
whereby each said circuit block has a drain terminal, a source terminal, and a gate terminal, said second circuit block, said first circuit block, said fourth circuit block, and said fifth circuit block connected in series with said source terminal of said first circuit block connected to said drain terminal of said second circuit block, said drain terminal of said first circuit block connected to said drain terminal of said fourth circuit block, said source terminal of said forth circuit block connected to said drain terminal of said fifth circuit block, said drain terminal of said third circuit block connected to said gate terminal of said second circuit block and coupled to said source terminal of said fifth circuit block through said first current limiting load, said drain terminal of said sixth circuit block connected to said gate terminal of said fifth circuit block and connected to said source terminal of said second circuit block through said third current limiting load, said gate terminal of said first circuit block and said source terminal of said third circuit block both connected to said source terminal of said second circuit block, said gate terminal of said forth circuit block and said source terminal of said sixth circuit block both connected to said source terminal of said fifth circuit block, said gate terminal of said third circuit block connected to said source terminal of said fifth circuit block through said second current limiting load, said gate terminal of said sixth circuit block connected to said source terminal of said second circuit block through said fourth current limiting load, a current path provided through said first circuit block, said second circuit block, said fourth block, and said fifth circuit block so that said third circuit block controls the ON and OFF status of said second circuit block and said second circuit block in turn controls the ON and OFF status of said first circuit block, and so that said sixth circuit block controls the ON and OFF status of said fifth circuit block and said fifth circuit block in turn controls the ON and OFF status of said fourth circuit block.

19. The bidirectional protection device of claim 18, wherein said first circuit block is at least one depletion mode n-channel transistor, said second circuit block is at least one enhancement mode n-channel transistor, said third circuit block is at least one enhancement mode n-channel transistor, said fourth circuit block is at least one depletion mode n-channel transistor, said fifth circuit block is at least one enhancement mode n-channel transistor, and said sixth circuit block is at least one enhancement mode n-channel transistor.

20. The bidirectional protection device of claim 19, further comprising:
(k) a capacitor;
(l) a voltage limiting component;
(m) a variable resistor; and
(n) a temperature compensation component;
whereby said capacitor, said variable resistor, and said temperature compensation component are connected between said source terminal and said gate terminal of each of said third circuit block and said sixth block and said voltage limiting component is connected between said source terminal and said gate terminal of each of said second circuit block, said third circuit block, said fifth circuit block and said sixth circuit block.

21. The bidirectional protection device of claim 20, wherein said current limiting loads are dynamic resistors.

22. The bidirectional protection device of claim 21, wherein said dynamic resistors are each formed by two depletion mode transistors and a constant resistor, said source terminal of the first one of said depletion mode transistors connected to said constant resistor and said gate terminal of the second one of said depletion mode transistors while said source terminal of the second one of said depletion mode transistor is connected to the other terminal of said constant resistor and said gate terminal of the first one of said depletion mode transistors.

23. The bidirectional protection device of claim 22, wherein said first circuit block and said fourth circuit block are each a depletion mode field-effect transistor, a depletion mode static induction transistor, or a depletion mode IGBT, and said second circuit block, said third circuit block, said fifth circuit block, and said sixth circuit block are each an enhancement mode field-effect transistor, an enhancement mode static induction transistor, or an enhancement mode IGBT.

24. The bidirectional protection device of claim 23, further comprising:
(o) a current bypass diode connected between said source terminal and said drain terminal of each of said second circuit block and said fifth circuit block and/or each of said first circuit block and said fourth circuit block.

25. The bidirectional protection device of claim 24, further comprising:
(p) an RC network connected parallel to said bidirectional protection device.

26. The bidirectional protection device of claim 24, further comprising:
(p) an RC network connected parallel to said first circuit block, said second circuit block and said third circuit block; and
(q) an RC network connected parallel to said fourth circuit block, said fifth circuit block, and said sixth circuit block.

* * * * *